United States Patent [19]
Nashiki

[11] Patent Number: 6,144,132
[45] Date of Patent: Nov. 7, 2000

[54] PERMANENT MAGNET MOTOR

[75] Inventor: Masayuki Nashiki, Niwa-gun, Japan

[73] Assignee: Okuma Corporation, Aichi, Japan

[21] Appl. No.: 09/359,800

[22] Filed: Jul. 26, 1999

[30] Foreign Application Priority Data

Aug. 3, 1998 [JP] Japan .................................. 10-219399

[51] Int. Cl.[7] .......................... H02K 37/00; H02K 21/12; H02K 21/00; H02K 23/04; H02K 1/22
[52] U.S. Cl. ............................ 310/156; 310/152; 310/46; 310/261
[58] Field of Search ............................. 310/152, 46, 156, 310/261

[56] References Cited

U.S. PATENT DOCUMENTS

| | | | |
|---|---|---|---|
| 4,873,462 | 10/1989 | Harned | 310/49 R |
| 4,918,346 | 4/1990 | Tajima et al. | 310/156 |
| 5,369,325 | 11/1994 | Nagate et al. | 310/156 |
| 5,642,013 | 6/1997 | Wavre | 310/254 |
| 5,760,503 | 6/1998 | Tsuchida et al. | 310/49 R |

*Primary Examiner*—Nestor Ramirez
*Assistant Examiner*—Guillermo Perez
*Attorney, Agent, or Firm*—Oliff & Berridge, PLC

[57] ABSTRACT

A permanent magnet motor is provided comprising a plurality of individual permanent magnets 7 threaded inside of a rotor, an N pole magnetic circuit commonly connected to N poles of the plurality of individual permanent magnets 7, an S pole magnetic circuit commonly connected to S poles of the plurality of individual permanent magnets 7, a plurality of N pole magnetic poles 5 positioned on the rotor surface, the N pole magnetic poles 5 being a part of the N pole magnetic circuit, and a plurality of S pole magnetic poles 6 positioned alternately with the N pole magnetic poles 5 in the rotational direction of the rotor, the S pole magnetic poles 6 being a part of the S pole magnetic circuit, wherein the change rate of the rotation of flux linked to the stator winding is increased to output a large torque.

12 Claims, 14 Drawing Sheets

PERMANENT MAGNET MOTOR

BACKGROUND OF THE INVENTION

1. Field of the Invention

The invention relates to a rotor structure and a rotor/stator structure of motors employing permanent magnets, some aspects of the invention particularly applying to a rotational motor and a linear motor.

2. Description of the Related Art

Motors employing permanent magnets, commonly called brushless motors, are widely used as servo control motors in commercial products and other devices.

FIG. 13 is a sectional view of a related permanent magnet motor. Reference numeral 1 represents a rotor axis which is also a magnetic path for the field flux. Reference numeral 2 represents a permanent magnet, and recently, cylindrical, sintered magnets made of Nd-Fe-B (Neodymium, Iron, Boron) system are often used. The permanent magnet 2 of the rotor is magnetized in 8 poles.

SC represents the yoke section for the stator and SCT represents a tooth of the stator. 24 slots are surrounded by the teeth. Around each slot is coiled 3-phase 8-pole stator winding and respective windings are labeled such as U1C, W8C, V1C, etc. FIG. 14 shows a specific example of the connection of each winding. U, V, and W are 3-phase terminals of the motor, and U1C–U2C, for example, represents a winding which is coiled between winding labels U1C and U2C in FIG. 13.

The operational principle of this permanent magnet motor is identical to the operational principle of a common brushless motor. A rotational torque is generated by applying a current through a winding with higher change rate of rotor rotation, that is, higher $d\phi/d\theta$, of the linkage flux of each of the windings, in response to the rotor rotation. When the rotor is rotating at a constant rate, by applying a 3-phase alternating current through each of the U, V, and W windings in synchronization with the rotor rotation, in principle, any torque of any magnitude can be obtained. The magnitude of the 3-phase alternating current is proportional to the magnitude of the desired torque.

In the permanent magnet motor shown on FIG. 13, the torque T generated by the current in each winding can be represented by $$T = KT \cdot I \cdot NT \cdot d\phi/d\theta \quad (1)$$

when considered partly. Here, KT is the torque constant, I the applied current, and NT the number of coils for the winding. $d\phi/d\theta$ is the change rate of rotation of the flux linked to the winding, and a torque proportional to $d\phi/d\theta$ can be obtained. A slot of the stator has an opening. The magnetic resistance of the stator side, as seen from the rotor side, has its magnetic resistance at the slot opening large but the width of the slot opening small, so that the flux produced by the permanent magnet on the rotor surface can be considered to go through the teeth of the stator nearly evenly. Therefore, the change rate of rotation $d\phi/d\theta$ of the flux and the generated torque of the motor are proportional to the flux density of the permanent magnet.

An objective of the present invention is to provide a motor in which a larger torque can be generated to thereby increase motor efficiency and reduce costs, and wherein the motor torque ripple is reduced and a precise control with less vibration and noise can be achieved.

One problem with the existing art is that, because of a constraint on the flux density of the permanent magnet, the saturated flux density of about 1.8 T for flat rolled magnetic steel sheets and strip, which is a silicon steel plate, is not efficiently used.

In general, force F=(flux density B)×(current I)×(effective length of the acting wire), as dictated by Fleming's left-hand rule. In the stator shown on FIG. 13, the teeth of the stator for letting flux through and each of the windings coiled on the slot are distributed throughout the circumference. The flux density B and the current I are related to each other in a tradeoff relationship because of the space consideration of the stator. In general, the maximum force F occurs when the flux density B and the current I are each 50%, that is, when the magnetic loading and the electric loading are of the same order. Therefore, the average flux density at the gap of the stator and the rotor is one half (about 0.9 T) of the maximum flux density (1.8 T) of the flat rolled magnetic steel sheets and strip. When a rare earth permanent magnet is used as the permanent magnet 2, the flux density is about 1.1 T for a magnet with a large flux density, and the motor architecture has a slightly larger magnetic loading.

Therefore, the permanent magnet motor shown on FIG. 13 has a problem that the change rate of rotation, $d\phi/d\theta$, of the flux is not efficiently using the saturated flux density 1.8 T of the flat rolled magnetic steel sheets and strip, that is, a problem that the generated torque is small.

Moreover, the torque ripples reduction techniques used in this related art employ a combination of a method to make the flux density in the rotational direction of the rotor generated by the rotor into more of a sine wave shape by making the magnet shape on the rotor surface a hog-backed smooth convex, a method to reduce the harmonic components by making the distribution of the windings more sine wave distribution, and a method to reduce the harmonic components by skewing the rotor or the stator. All of these suffer from the problem that motor output torque is reduced.

Stator problems also are present including a problem of number of work processes involved due to the complexity of the work to coil the winding to each slot of the permanent magnet motor shown on FIG. 13, a problem of the winding density for winding of each slot being limited to only about 40%, a problem of the motor length becoming long as a result of the coil end becoming longer due to the requirement that the winding need to be inserted into the slot, and a problem of the temperature increase at the coil end section becoming larger due to the coil end section becoming larger. All of these problems add to the cost of designing and producing a motor.

SUMMARY OF THE INVENTION

To achieve the objectives of increasing generated torque, increasing efficiency, decreasing size, lowering cost, and reducing torque ripple, the permanent magnet motor according to the invention comprises, stator salient poles of each phase positioned in a stator, a winding of each phase coiled on each of said stator salient poles, a plurality of individual permanent magnets threaded inside a rotor, an N pole magnetic circuit commonly connected to N poles of said plurality of individual permanent magnets, an S pole magnetic circuit commonly connected to S poles of said plurality of individual permanent magnets, a plurality of N pole magnetic poles positioned on the rotor surface, said N pole magnetic poles being a part of said N pole magnetic circuit, and a plurality of S pole magnetic poles positioned alternately with said N pole magnetic poles in the rotational direction of the rotor, said S pole magnetic poles being a part of said S pole magnetic circuit.

Moreover, a permanent magnet motor according to the invention may comprise an N pole support magnetic pole connecting said N pole magnetic pole and other N pole magnetic poles adjacent in the axial direction, and an S pole support magnetic pole connecting said S pole magnetic pole and other S pole magnetic poles adjacent in the axial direction, wherein said N pole magnetic circuit and said S pole magnetic circuit are alternately laminated in the axial direction of the rotor.

Furthermore, by having a common permanent magnet positioned between said N pole magnetic circuit and said S pole magnetic circuit and threaded inside a rotor, the motor field is strengthened and increase in motor torque is achieved.

Similar advantages and characteristics can be obtained in a structure similar to said motor structure with said common permanent magnet in place and without said individual permanent magnet.

Said N pole magnetic circuit and said S pole magnetic circuit may have a structure in which flat rolled magnetic steel sheets and strips positioned perpendicular to the rotor axis are laminated in the axial direction. By having the N pole magnetic circuit and said S pole support magnetic poles, connected partly to the N pole magnetic circuit, in the same plane on each of the flat rolled magnetic steel sheets and strips, or the S pole magnetic circuit and said N pole support magnetic poles, slightly connected partly to the S pole magnetic circuit, in the same plane on each of the flat rolled magnetic steel sheets and strips, the motor fabrication is simplified even though the motor has a complex structure.

The shape of the section of the coil which acts as the winding of each phase coiled on each of said stator salient poles may be designed smaller than the slot entrance width between each of the salient polesin order to allow fabrication of said coil outside the stator and then insertion into the stator salient pole to assemble. The shape CK1 of one type of said coil is nearly cylindrical and thinner than the slot entrance width, and the shape of the section of the shape CK2 of the other type of said coil is a shape having its area as the slot shape with the shape of section of said shape CK1 removed to avoid interference when said shape CK1 is inserted into the stator salient pole.

As another method to reduce the motor ripple, a plurality of stator salient poles exist for the same phase, and the phases of these stator salient poles relative to the rotor magnetic pole are shifted in the rotational direction of the rotor, by values of 60, 36, 25.7, or 16.36 electric degrees to remove harmonic components of the third, the fifth, the seventh, and the eleventh order, etc.

Moreover, the axial direction of the stator or the rotor may be divided, and respective electromagnetic characteristics are relatively shifted in the rotational direction of the rotor, by values of 60, 36, 25.7, or 16.36 electric degrees to remove harmonic components of the third, the fifth, the seventh, and the eleventh order, etc.

Objectives of this structure include increase in the torque generated, increase in the efficiency, decrease in size, decrease in the cost, and reduction of the torque ripples.

In order to increase the torque generated, the opening for each stator slot may be broadened and shaped as a salient pole, causing the change rate of rotor rotation of the flux supplied from the rotor side to be able to increase, and thereby further increasing torque.

By structuring the plurality of N pole magnetic poles and S pole magnetic poles positioned on the rotor surface as flat rolled magnetic steel sheets and strips instead of permanent magnets, the sections of the N pole magnetic poles or the S pole magnetic poles opposing the opening of each stator slot are configured so that no adverse flux is generated for production of torque. On the other hand, by using the currently-used silicon steel plate as the flat rolled magnetic steel sheets and strip, a flux density of about 1.8 T can be obtained at the N pole magnetic poles or S pole magnetic poles opposing the salient pole section of the stator, allowing for production of larger torque.

Specifically, in the above mentioned structure for not generating an adverse flux is a structure including an N pole magnetic circuit, commonly connected to the N pole of each of the permanent magnets and threaded to inside of the rotor, and an S pole magnetic circuit, commonly connected to the S pole of each of the permanent magnets, and supplies an effective flux only to required portions. By configuring the structure to enable the operation point of each of the permanent magnet at the BH characteristics to operate in a region where the magnetic impedance is relatively small, the structure prevents generation of adverse flux to the openings of the stator etc., for the production of the torque.

As for the point of motor cost, the fabrication and assembly of the rotor members can be simplified by configuring the N pole magnetic circuit and the S pole magnetic circuit by flat rolled magnetic steel sheets and strip laminated in the axial direction. The flat rolled magnetic steel sheets and strips are configured to have a hole for inserting the permanent magnet to simplify threading. The portions on the plane of the flat rolled magnetic steel sheets and strips that are not desired to be magnetically combined are structured so that only a narrow connecting section, with a bare minimum strength, is connected. The flux going through the narrow connecting section is sacrificed, and a single unit of plane structure is achieved. If the components form a single unit in a plane, handling of each component at the time of fabrication and assembly of the flat rolled magnetic steel sheets and strip are simplified. By fabricating the flat rolled magnetic steel sheets and strips which are planer but have slightly complex shape by presswork at a sheet metal pressing machine, and inserting an electromagnet in a portion of the flat rolled magnetic steel sheets and strip after laminating, a rotor can be fabricated relatively easily.

To reduce stator cost, it is desirable to have simple, high density, and low cost coiling of the windings on the stator core.

In the permanent magnet motor according to the present invention, the teeth of the stator form salient pole shape in the radial direction on a straight line. The coil can be fabricated outside of the motor by using a winding machine and by aligned-coiling at high density and then molding. This coil can then be inserted to the salient pole of the stator, allowing for simple assembly. If all the coils coiled on each salient pole have the same shape, the coils physically interfere with adjacent coils when the coils are inserted. Because of this, two types of coil shapes are provided. The motor is assembled by first inserting and placing coils of one shape in the stator salient poles skipping one stator pole for each coil inserted in the circumferential direction of the motor, followed by insertion and placement of coils of the other shape on the remaining salient poles. Here, the shape of the coils placed at first are required to be a shape in which coils of the other shape will not physically interfere when they are placed.

For a method to reduce torque ripple in the motor, by having a plurality of stator salient poles for the same phase, and by shifting the phases of these stator salient poles relative to the rotor magnetic pole in the rotational direction of the rotor, by values of 60, 36, 25.7, or 16.36 electric degrees to remove harmonic components of the third, the fifth, the seventh, and the eleventh order, etc., specific harmonic components can be removed with certainty.

Moreover, by having the axial direction of stator or rotor divided, and by shifting respective electromagnetic characteristics relatively in the rotational direction of the rotor, by values of 60, 36, 25.7, or 16.36 electric degrees to remove harmonic components of the third, the fifth, the seventh, and the eleventh order, etc., specific harmonic components can be removed with certainty.

Using these techniques of removing the harmonic components, a third order harmonic removal technique by 3-phase Y-connection, and a technique of skewing the stator or the rotor, main harmonics can be removed, and a motor with 3-phase sine wave characteristics can be achieved.

BRIEF DESCRIPTION OF THE DRAWING(S)

DESCRIPTION OF PREFERRED EMBODIMENTS

Figure 1:
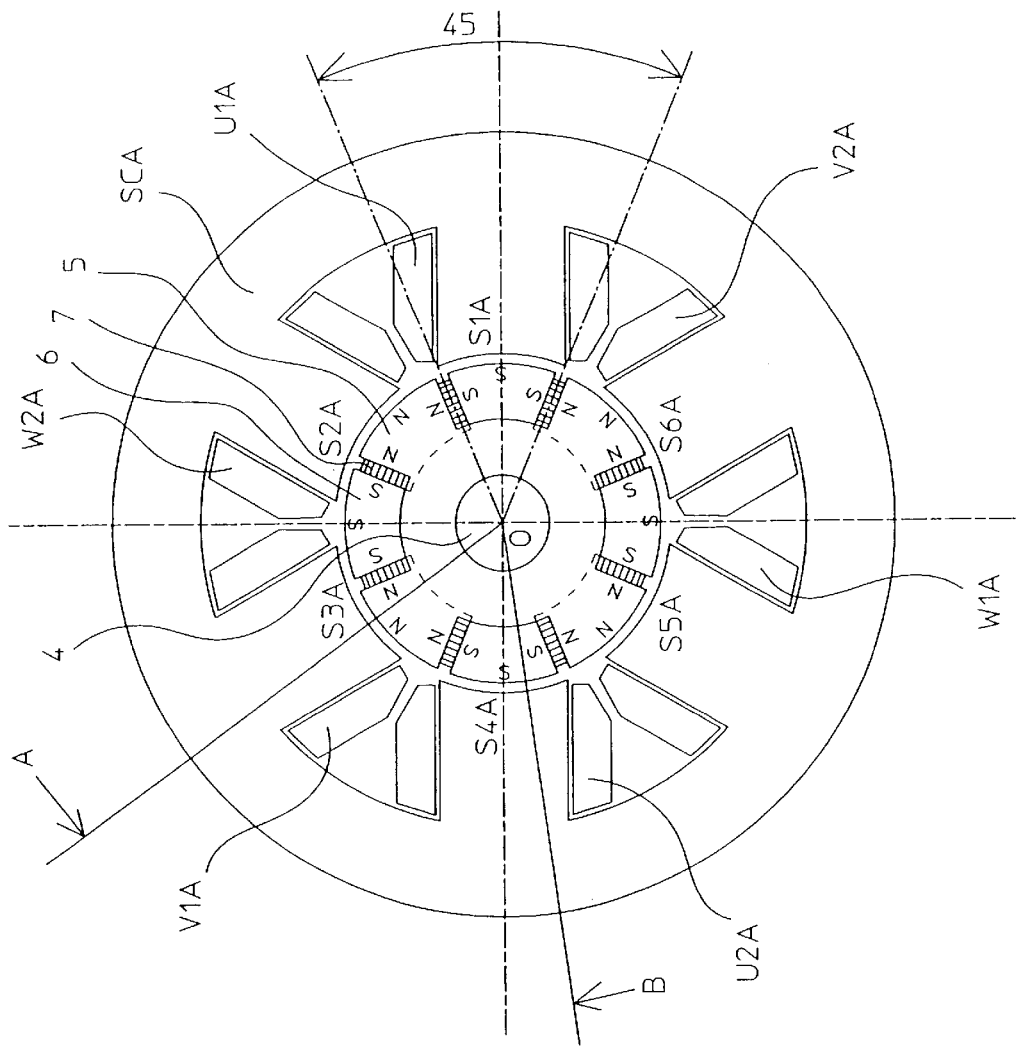
FIG. 1 is a sectional view of a permanent magnet motor according to the present invention.

In FIG. 1, the structure of a stator and a rotor of a permanent magnet motor according to an embodiment of the present invention is shown. Similar to the example of the prior art permanent magnet motor shown on FIG. 13, an 8-pole permanent magnet motor is shown.

SCA is the yoke section of the stator. S1A, S2A, S3A, S4A, S5A, and S6A represent the teeth of the stator, and the width of the teeth of the stator is 45 degrees. The teeth have a concentrated salient pole shape. In FIG. 1, a winding U1A of U-phase is coiled on the tooth S1A located at the furthest to the right. On the tooth S4A located at the furthest to the left, a winding U2A of U-phase is also coiled. On the tooth S3A, a winding V1A of V-phase is coiled, and a winding V2A of V-phase is also coiled on the tooth S6A, located at 180 degrees from the tooth S3A. A winding W1A of W-phase is coiled on the tooth S5A, and a winding W2A of W-phase is coiled on the tooth located at 180 degrees from the tooth S5A.

The axis of the rotor 4 is made of nonmagnetic body such as stainless steel. Individual permanent magnets 7 have their N poles and S poles in the direction shown. The rotor has 8 poles and is similar to the related permanent magnet motor shown on FIG. 13, except for its slightly more complex shape. The basic structure of the magnetic material of the rotor, as well as the stator, is flat rolled magnetic steel sheets and strip laminated in the axial direction. However, the invention is not limited p to flat rolled magnetic steel sheets and strips.

Reference numeral 5 represents an N pole magnetic pole. There are four N pole magnetic poles placed on the rotor perimeter, each of which is magnetically associated to the N pole of the individual permanent magnet 7. These four N pole magnetic poles are magnetically associated by the N pole magnetic circuit which is nearly disc shaped at the center and to which the N pole magnetic poles are commonly connected. The N pole magnetic pole 5 forms a part of the N pole magnetic circuit.

Similar to the N pole magnetic pole 5, an S pole magnetic pole 6, with a portion shown by a dotted line, is an S pole magnetic pole of the rotor, and four S pole magnetic poles are placed on the rotor perimeter. Each of the S pole magnetic poles is magnetically associated to the S pole of the individual permanent magnet 7. These four S pole magnetic poles are magnetically associated by the S pole magnetic circuit which has a nearly disc shape at the center and to which the S pole magnetic poles are commonly connected. The S pole magnetic pole 6 forms a part of the S pole magnetic circuit.

The N pole magnetic circuit 5 and the S pole magnetic circuit 6 are slightly separated from each other so that they are not magnetically associated, and they are arranged alternately in the axial direction of the rotor.

Figure 2:
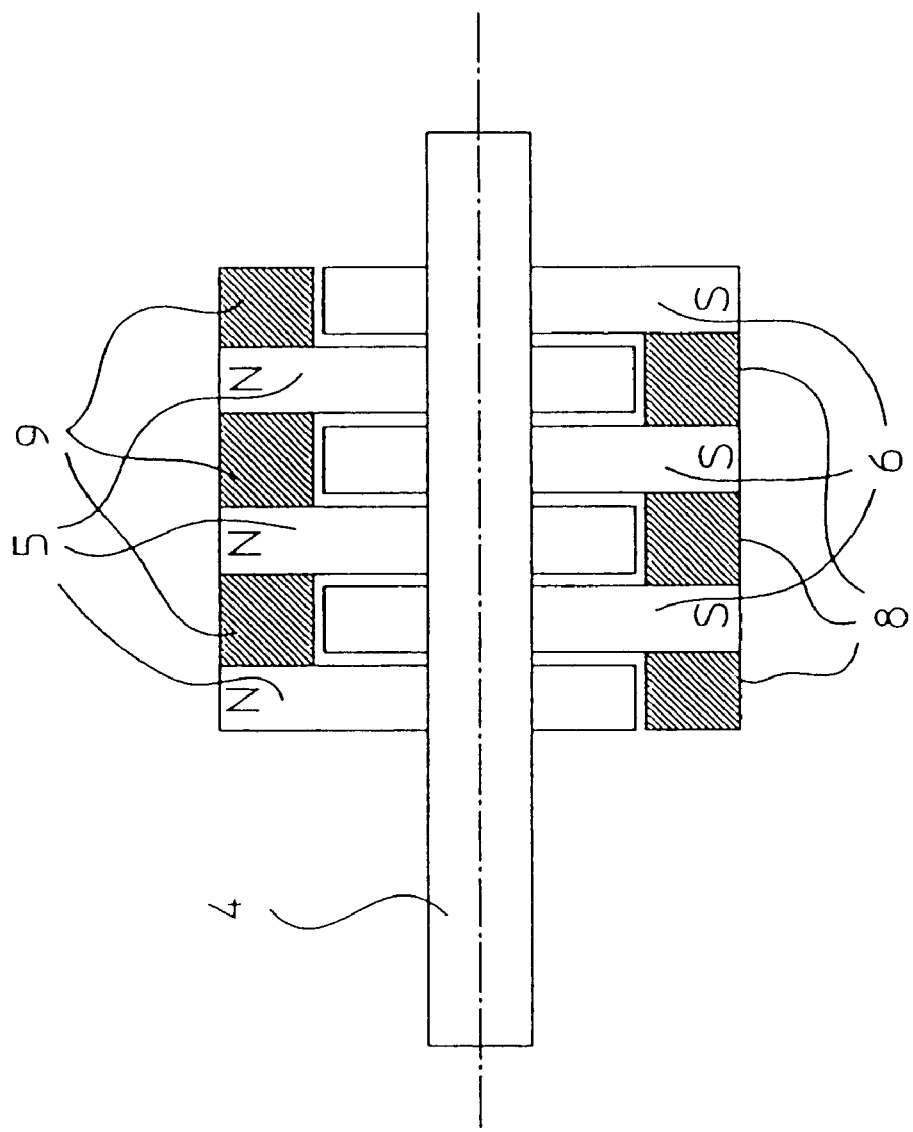
FIG. 2 is a sectional view along the section AOB of the permanent magnet motor of FIG. 1.

The cross section AOB of the rotor structure is shown on FIG. 2. The N pole support magnetic poles 9 are placed between each N pole magnetic pole 5. Both ends in the axial direction of the rotor touch the N pole of the individual permanent magnet 7. S pole support magnetic poles 8 are placed between each S pole magnetic pole 6. Both ends in the axial direction of the rotor touch the S pole of the individual permanent magnet 7.

Figure 3:
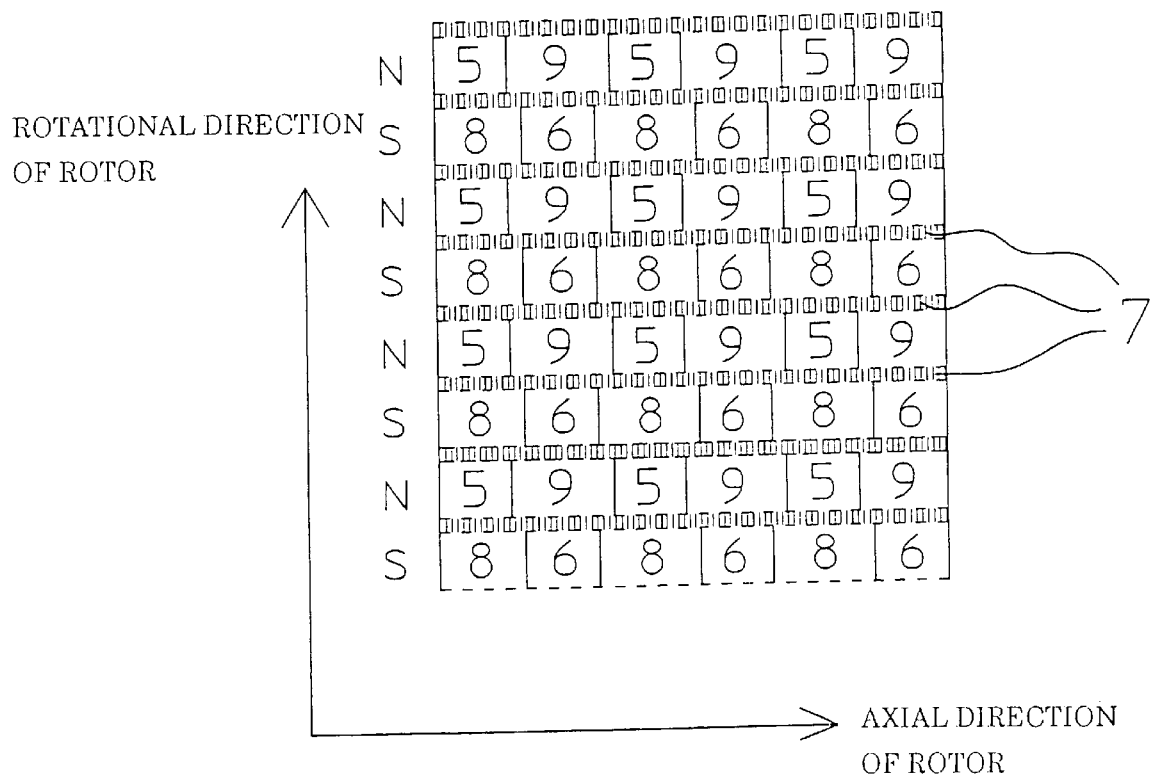
FIG. 3 is a planer development of the shape of the rotor surface of FIG. 1.

FIG. 3 is a top view of the periphery surface of the rotor unfolded into a plane. The horizontal axis represents the axial direction of the rotor and the vertical axis represents the rotational direction of the rotor. Individual permanent magnets 7, each N pole magnetic pole 5, each S pole magnetic pole 6, each N pole support magnetic pole 9, and each S pole support magnetic pole 8, each of which forms a component, are arranged in a relationship as shown in FIG. 3.

Figure 4:
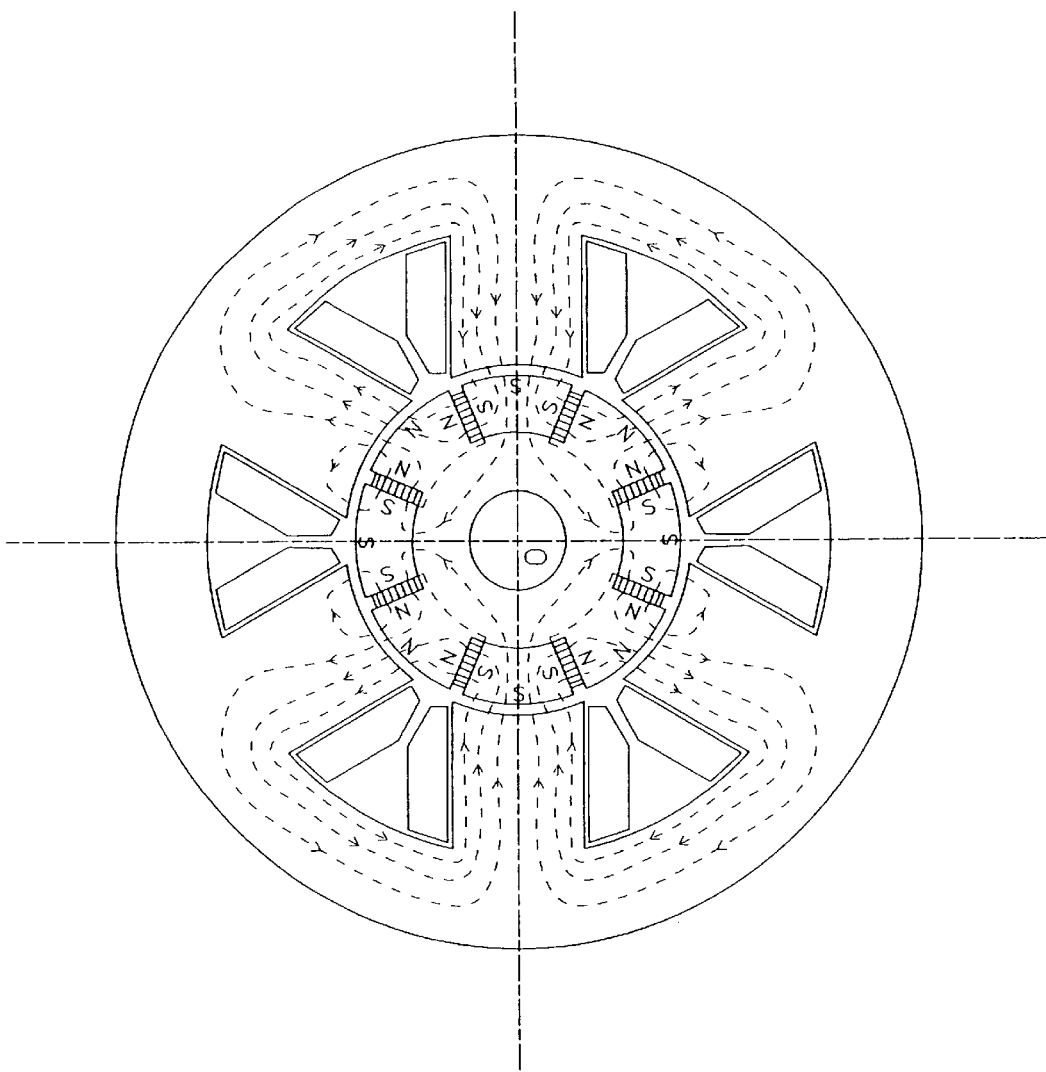
FIG. 4 shows the flux distribution of the permanent magnet motor of FIG. 1.

FIG. 4 shows a diagrammatic example of the flux distribution of the permanent magnet motor shown in FIG. 1. As described above, the flux from the N pole of the permanent magnet and the flux from the S pole of the permanent magnet are magnetically separated inside the rotor. The flux from each of the S poles are magnetically associated inside the rotor by the S pole magnetic circuit and the flux from each of the N poles are magnetically associated inside the rotor by the N pole magnetic circuit.

Referring to the flux existing on the rotor surface of the permanent magnet motor shown on FIG. 4, internal surfaces of each tooth of the stator all have a large flux density. The flux density is small for the slot opening between the teeth of the stator. The tooth of the stator shown at center right of the FIG. 4 completely opposes an S pole magnetic pole of the rotor, and flux from each of the S poles of the individual permanent magnets placed on both sides of the S pole magnetic pole and the flux from each of the S poles of the individual permanent magnets placed far away supply flux to the tooth of the stator shown at center right. The tooth of the stator shown at center left of the FIG. 4 also completely opposes an S pole magnetic pole of the rotor, and flux from each of the S poles of the individual permanent magnets placed on both sides of the S pole magnetic pole and the flux from each of the S poles of the individual permanent magnets placed far away supply flux to the tooth of the stator shown at center left. An S pole magnetic pole of the rotor shown at the top of FIG. 4, on the other hand, has ⅓ of its central section opposing the slot opening of the stator, and this ⅓ magnetic pole does not need to supply flux. Similarly, an S pole magnetic pole of the rotor shown at the bottom of FIG. 4 has ⅓ of its central section opposing the slot opening of the stator, and this ⅓ magnetic pole does not need to supply flux.

Inside the rotor, all S poles are commonly connected by the S pole magnetic circuit, and flux is supplied from an S pole magnetic pole with no need of flux to another S pole magnetic pole which needs flux. Similarly, all N poles are commonly connected by the N pole magnetic circuit, and the structure is such that flux is supplied from an N pole magnetic pole with no need of flux to another N pole magnetic pole which needs flux. In this rotor structure, each individual permanent magnet is magnetically connected in parallel with common magnetic circuit, and therefore, the operation point on magnetic characteristics of the flux density B and magnetomotive force H of each individual permanent magnet can be considered to be almost equal. Thus, the magnetomotive force H generated at each of the individual permanent magnets is always at an appropriate magnitude, a large flux will not be supplied at the slot opening of the stator, and adverse magnetic operations for torque generation at the motor will not be generated.

As a result of this operation, the flux existing at each of the teeth of the stator greatly changes with the rotation of the rotor, allowing for larger change rate of the rotation $d\phi/d\theta$ of flux, and production of a larger torque is achieved. When an appropriate motor shape architecture is followed, a change rate of the rotation $d\phi/d\theta$ of flux corresponding to the saturated flux density 1.8 T of the flat rolled magnetic steel sheets and strip can be obtained, and in principle, a torque with a prior ratio of 1.8 T/1.1 T=1.636, that is, 1.636 times stronger than in known motors, can be generated.

Figure 5:
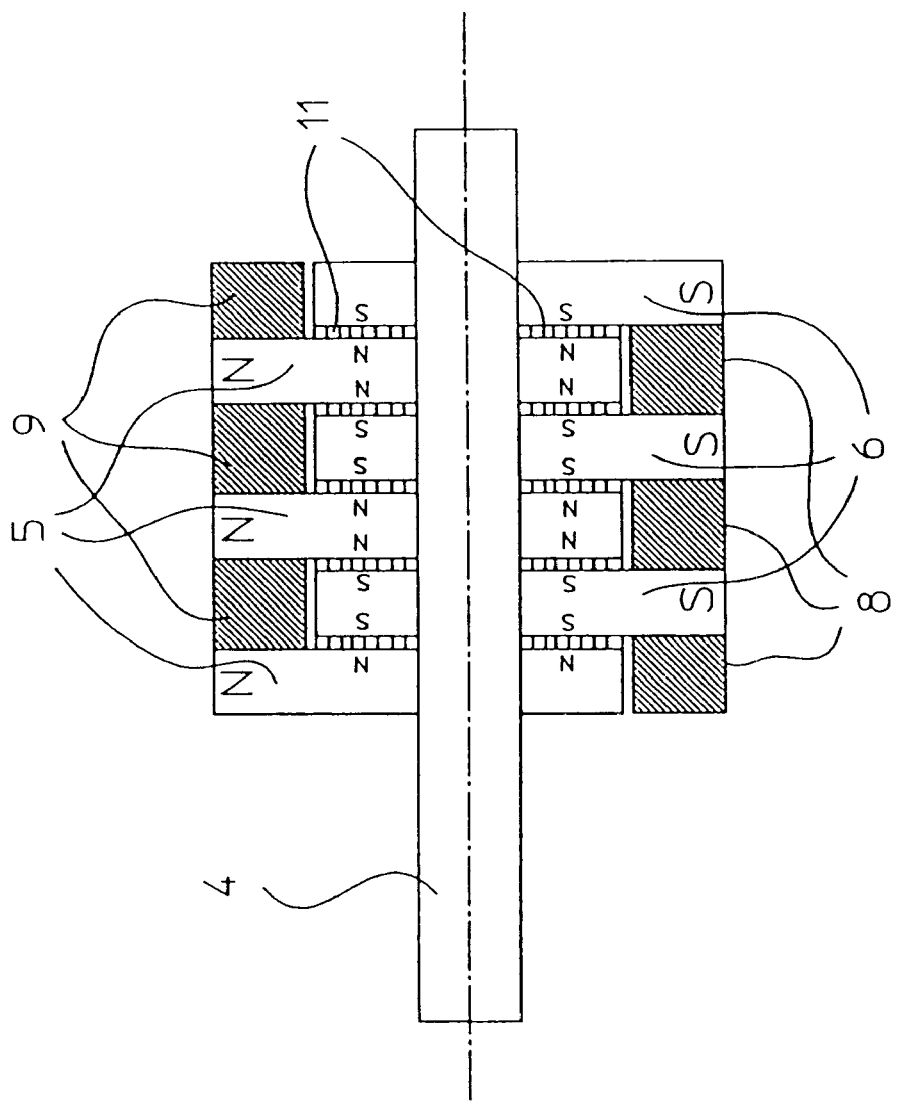
FIG. 5 is a sectional view along the section AOB of another permanent magnet motor according to the present invention.

Next, a sectional view of axial direction of another embodiment of the invention is shown on FIG. 5. The radial direction sectional view of the permanent magnet motor shown on FIG. 5 is identical to FIG. 1, and FIG. 5 represents the section AOB of FIG. 1. The permanent magnet motor shown on FIG. 5 has a common permanent magnet 11 added in comparison with the permanent magnet motor shown on FIG. 2. The N pole magnetic poles 5 and the S pole magnetic poles 6 are excited to the same polarity as the individual permanent magnets 7 by the common permanent magnet 11, and the magnetic characteristics of each of the magnetic poles of the rotor is strengthened when compared to the permanent magnet motor shown on FIG. 2. Therefore, a larger torque can be generated. Similarly, a permanent magnet with lower flux density and reduced cost can easily be utilized.

Figure 6:
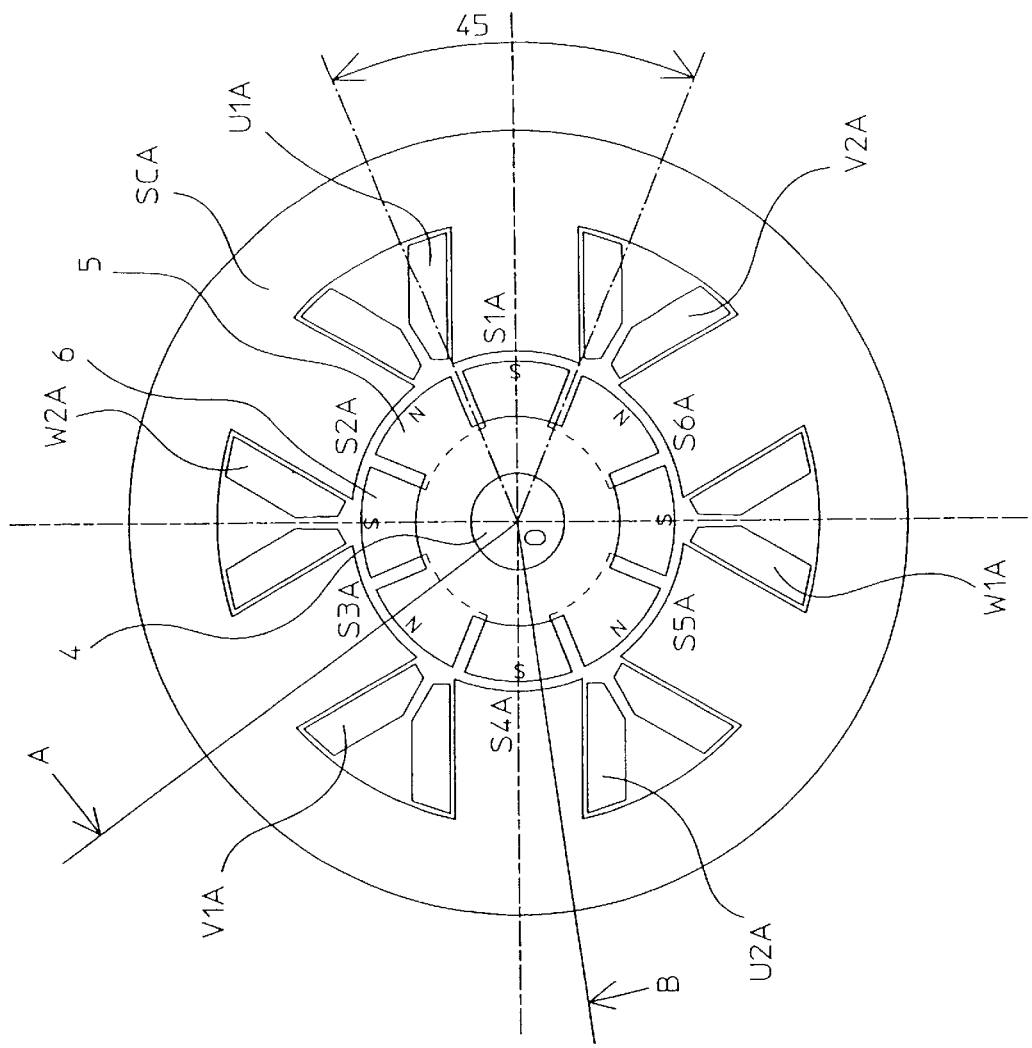
FIG. 6 is a sectional view of another permanent magnet motor according to the present invention.

FIG. 6 shows a sectional view in the radial direction of another embodiment of the invention. The sectional view AOB in the axial direction of the permanent magnet motor shown on FIG. 6 is identical to that shown on FIG. 5. The permanent magnet motor shown on FIG. 6 has the individual permanent magnet 7 omitted from the permanent magnet motors shown on FIGS. 1 and 5. Because the individual permanent magnet 7 does not exist, the number of the parts is reduced, and assembly can be simplified.

Figure 7:
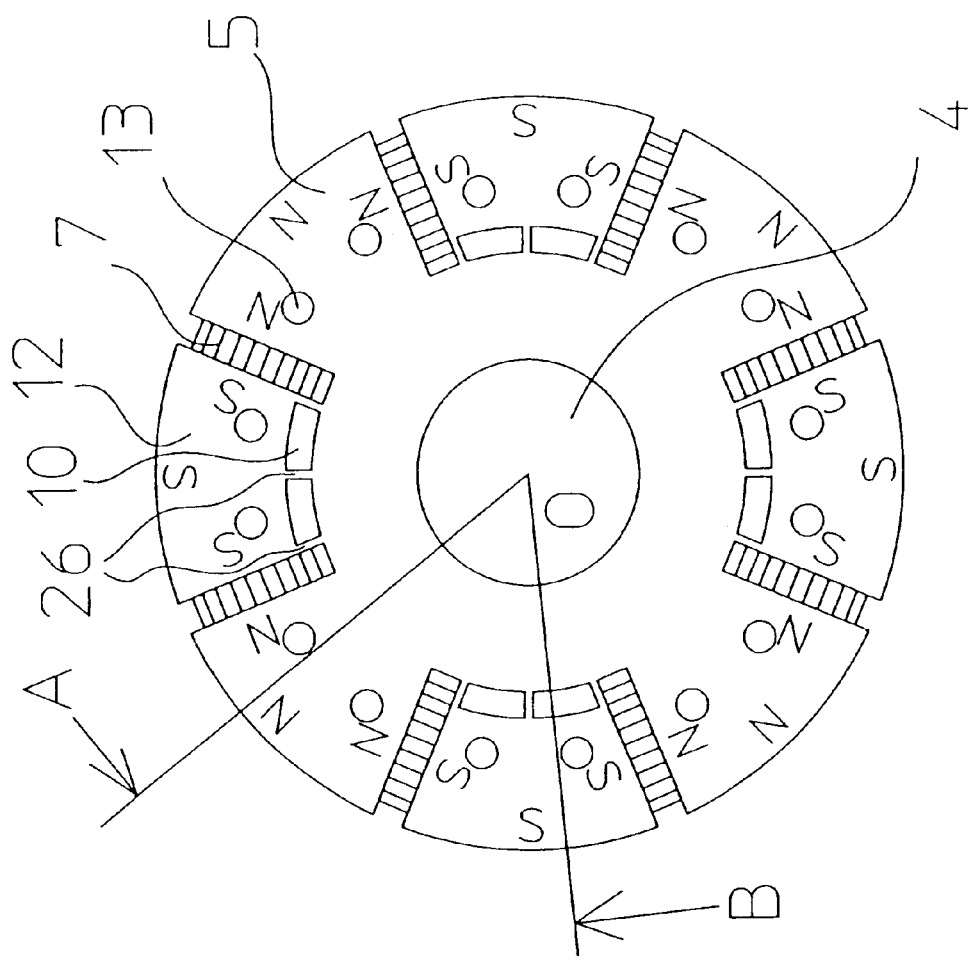
FIG. 7 is a sectional view of the rotor of a permanent magnet motor according to the present invention.

FIG. 7 shows a sectional view in the radial direction of another embodiment of the invention. In this permanent magnet motor, the N pole magnetic pole 5, the N pole magnetic circuit near the center section, and the S pole support magnetic pole 12 are structured on the flat rolled magnetic steel sheets and strip laminated in the axial direction. The connecting section 26 narrowly connected is not required magnetically. Indeed, it is disadvantageous because a leak flux is generated between the N pole and the S pole of the permanent magnet 7. However, when a presswork is performed on the flat rolled magnetic steel sheets and strip by pressing machine and when the rotor is assembled, the connecting section 26 is useful to maintain each of the flat rolled magnetic steel sheets and strip to not to fall apart, and to maintain the strength as a rotor when the flat rolled magnetic steel sheets and strip operates as a motor. An air gap 10 is provided to magnetically separate the N pole and the S pole in the rotor. A salient 13, shown as a circle, is needed for automatic laminate process by the pressing machine, and provides asperity in the direction of front and back sides of the flat rolled magnetic steel sheets and strip with a thickness of half the thickness of the flat rolled magnetic steel sheets and strip. By this salient, the flat rolled magnetic steel sheets and strips of before and after the lamination are press welded. A structure with a position of the connecting section 26 changed is shown on FIG. 8. In this case, the perimeter of the rotor can be made into circular shape. The outline shape precision of the rotor can easily be made to high precision, and the strength of the rotor can easily be maintained.

Figure 8:
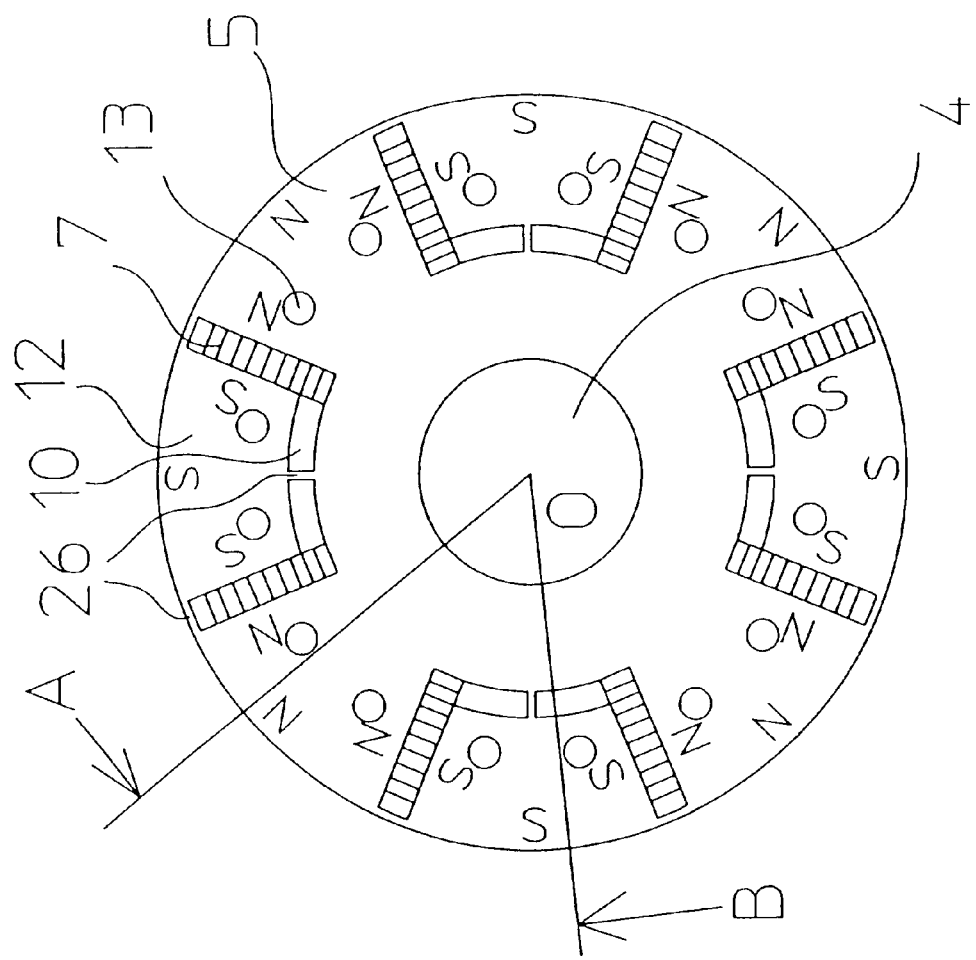
FIG. 8 is a sectional view of the rotor of another permanent magnet motor according to the present invention.
Figure 9:
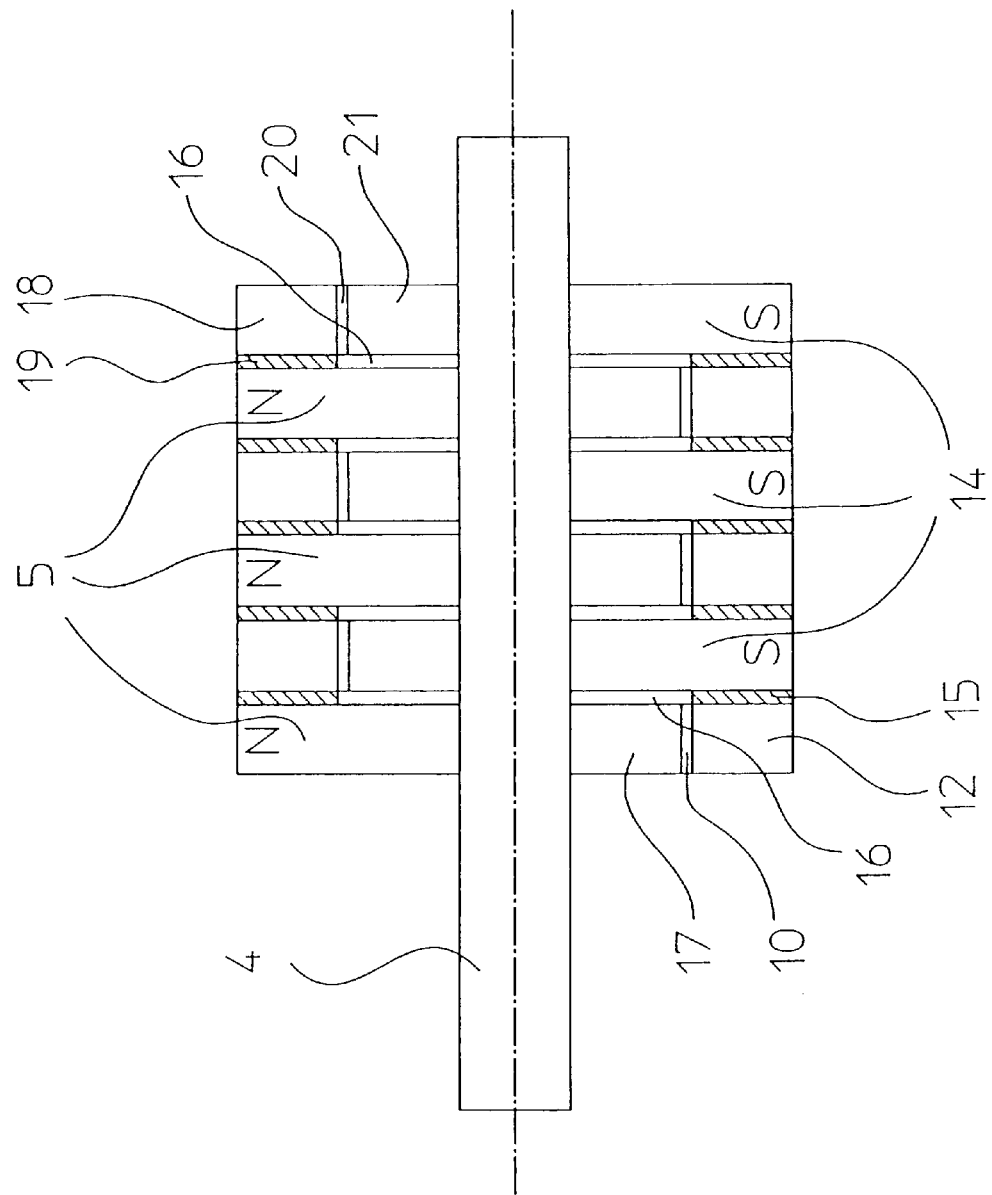
FIG. 9 is a sectional view along the sections AOB of the rotors of FIGS. 7 and 8.

A sectional view AOB in the axial direction of the rotor shown on FIGS. 7 and 8 is shown on FIG. 9. An S pole magnetic circuit 21 is connected to an S pole magnetic pole 14 and through the connecting section 26, connected to an N pole support magnetic pole 18. An air gap 20 is provided for magnetically separating the N pole and the S pole in the rotor. A magnetic body 15 is provided for magnetically connecting the S pole magnetic pole 14 and the S pole support magnetic pole 12. A magnetic body 19 is provided for magnetically connecting the N pole magnetic pole 15 and the N pole support magnetic pole 18. Reference numeral 16 represents an air gap or a magnetic insulating substance for separating the N pole and the S pole in the rotor, and it is possible to add and place a common permanent magnet 11 on this part.

Figure 10:
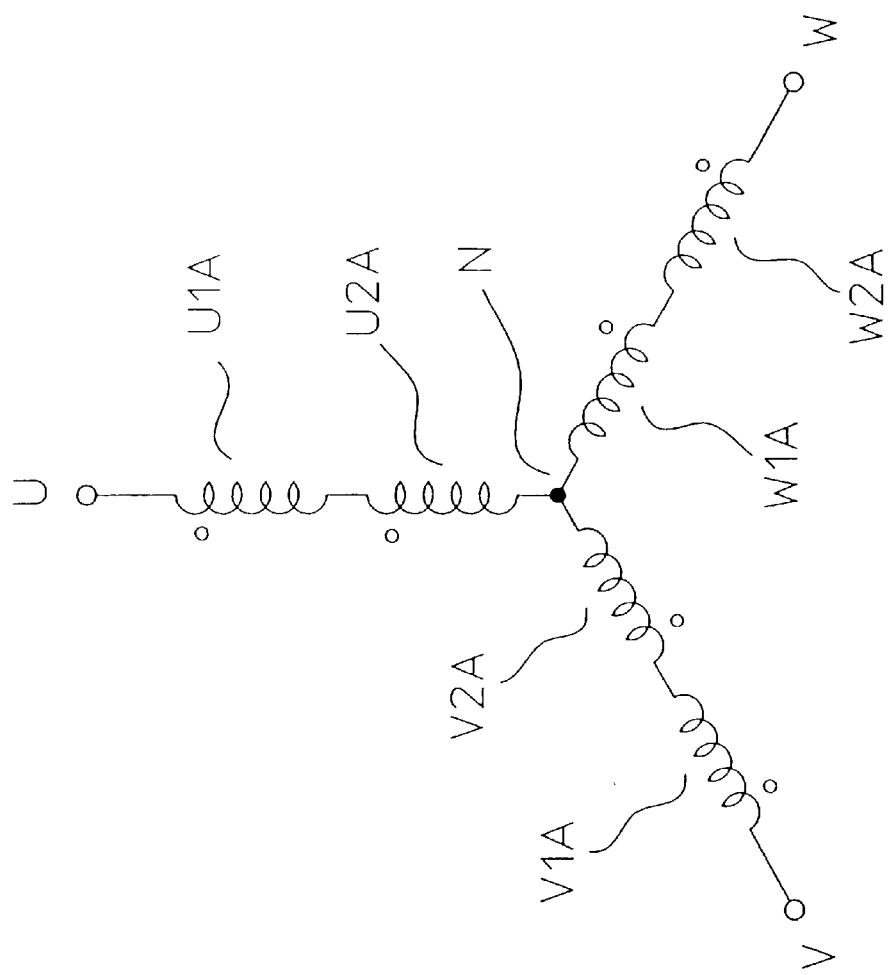
FIG. 10 is a connection view of the stator windings of a permanent magnet motor of the present invention.

FIG. 10 shows winding relationships of the stator windings of the permanent magnet motor shown on FIG. 1. U, V, and W represent 3-phase motor terminals. Each of the windings, U1A, U2A, V1A, V2A, W1A, and W2A are connected as shown on FIG. 10, with small circles representing the coiling direction of each of the windings. N represents the neutral point of the star coiling.

Figure 11A:
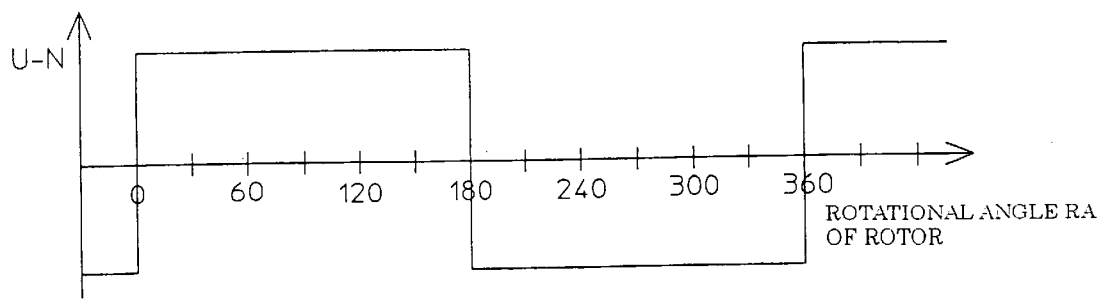
FIG. 11 shows induced voltage waveforms of a permanent magnet motor of the present invention.
Figure 11B:
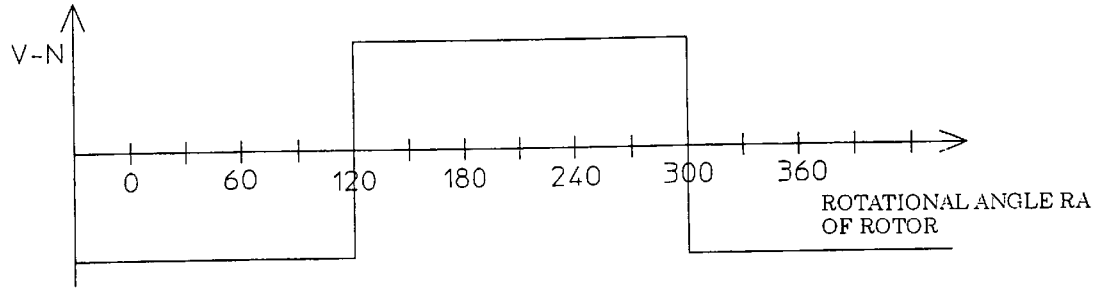

FIG. 11 shows the induced voltage induced on each of the windings when the permanent magnet motor shown on FIG. 1 is rotated with a constant rotational rate, with its horizontal axis representing the rotor rotational angle RA in electric degrees. FIG. 11(a) shows induced voltage U-N between the U-phase terminal and the neutral point N. Similarly, FIG.

Figure 11C:
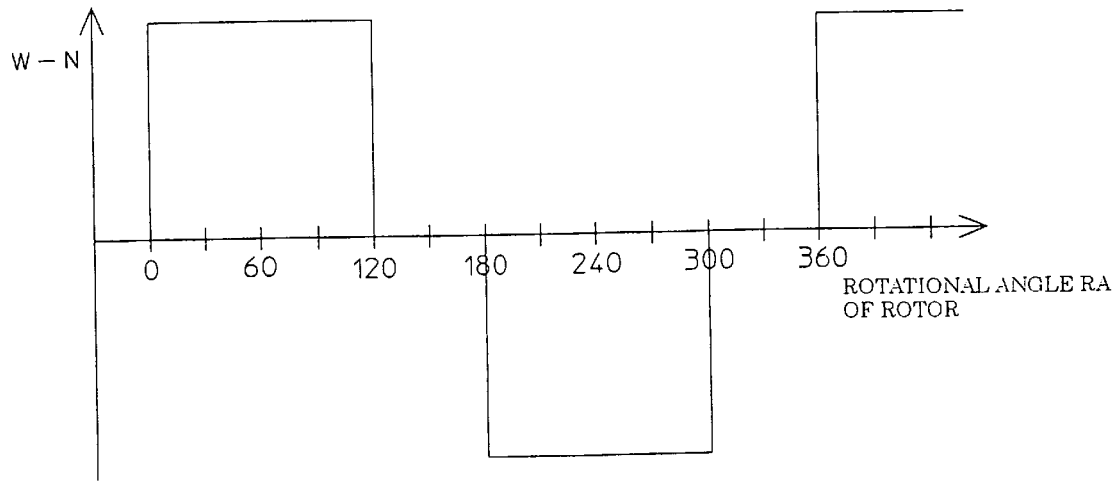

11(b) shows induced voltage V-N and FIG. 11(c) shows induced voltage W-N. These are 3-phase rectangular wave voltage, each of which has a phase shifted 120 electric degrees relative to each other. In practice, because leak flux between the rotor and the stator exists and the rotor surface flux density of each of the N pole magnetic poles and S pole magnetic poles is not perfectly even, the waveform of the voltage will be rectangular with its corner slightly smoothed.

The amplitude of each of the voltages shown on FIG. 11 is explained hereinafter. As an example, the flux going through the stator salient pole S2A of the permanent magnet motor shown on FIG. 1, that is, the flux linked to the W-phase winding W2A, depends on the rotor surface flux density of the portion opposing the stator salient pole S2A. On the rotor surface, for the portion opposing each of the stator salient poles, it is possible to supply a sufficient flux to each of the stator salient poles through the individual permanent magnet 7 or the common permanent magnet 11, and the flux density of that portion can be increased to the saturated flux density 1.8 T of the flat rolled magnetic steel sheets and strip. Here, the rotor surface opposing the stator salient pole S2A has its S pole magnetic pole 6 of about 35% relative to the stator salient pole width in the rotational direction and N pole magnetic pole 5 of about 65%, and the difference of about 30% goes through the stator salient pole S2A with its flux $\phi$ linked to the winding W2A. Representing the number of turns of stator salient pole W2A by TN, the induced voltage (W-N)/2 on this winding becomes $$(W-N)/2 = TN \times d\phi/d\theta \qquad (1)$$

In this equation, $\theta$ is the rotor rotational angle, and $d\phi/d\theta$ is the change rate of rotation $d\phi/d\theta$ of the flux linked to the winding W2A. Assuming the rotor is rotating with a constant rotational rate in counterclockwise direction, the flux $\phi$ linked to the winding W2A has the N pole flux increasing, and because the flux density at that portion is 1.8 T, the change rate of rotation $d\phi/d\theta$ of the flux becomes an amount corresponding to 1.8 T.

Figure 13:
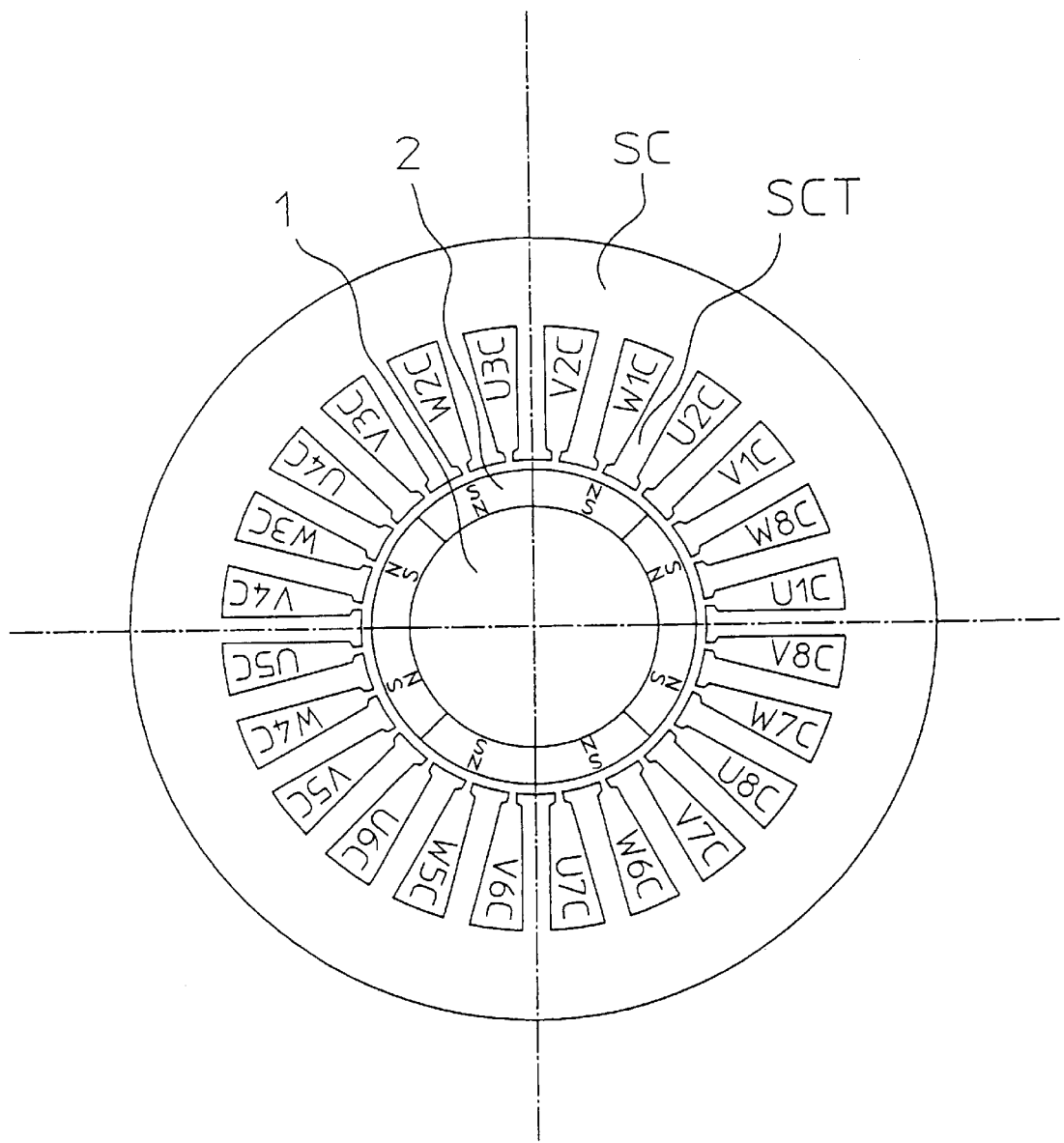
FIG. 13 is a sectional view of a prior art permanent magnet motor.
Figure 14:
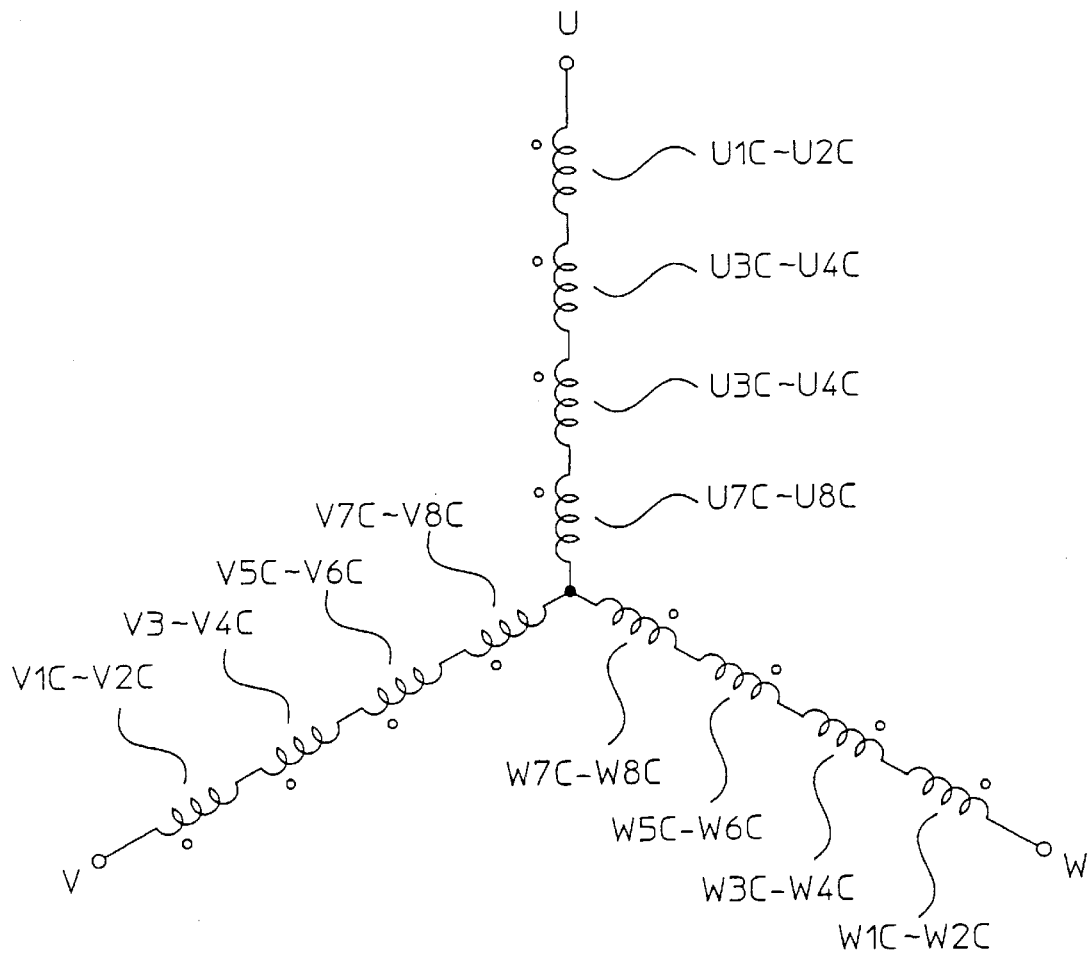
FIG. 14 is a connection view of the stator windings of a prior art permanent magnetic motor.

In the case of the permanent magnet motor shown on FIG. 13, on the other hand, the average flux density at the rotor surface linked to each of the stator windings is 1.1 T, even when rare earth permanent magnets with a larger flux density is used. Therefore, the voltage induced on each of the stator windings are proportional to the change rate of rotation, $d\phi/d\theta$, of the flux, and will be an amount corresponding to 1.1 T.

Because the permanent magnet motor according to the invention shown on FIG. 1 and the permanent magnet motor shown on FIG. 13 differ in the stator structure, it is difficult to directly compare the induced voltages, so the comparisons in this publication assume that the total numbers of windings for each of the motors are equal. Because the value of the induced voltage generated on each of the windings is proportional to the flux density acting on the stator windings, the permanent magnet motor according to the invention can be said to have 1.8/1.1=1.636 times as much voltage generated compared to the prior art permanent magnet motors. The torque generated when an equal amount of current is applied to both motors will also be 1.636 times, and the permanent magnet motor according to the invention can generate a larger torque.

For the waveform of the motor current, a 3-phase sine wave shaped current can be applied. However, the waveform of the motor current can also be controlled to, for example, a trapezoidal wave shaped current suitable as a voltage waveform.

Figure 12:
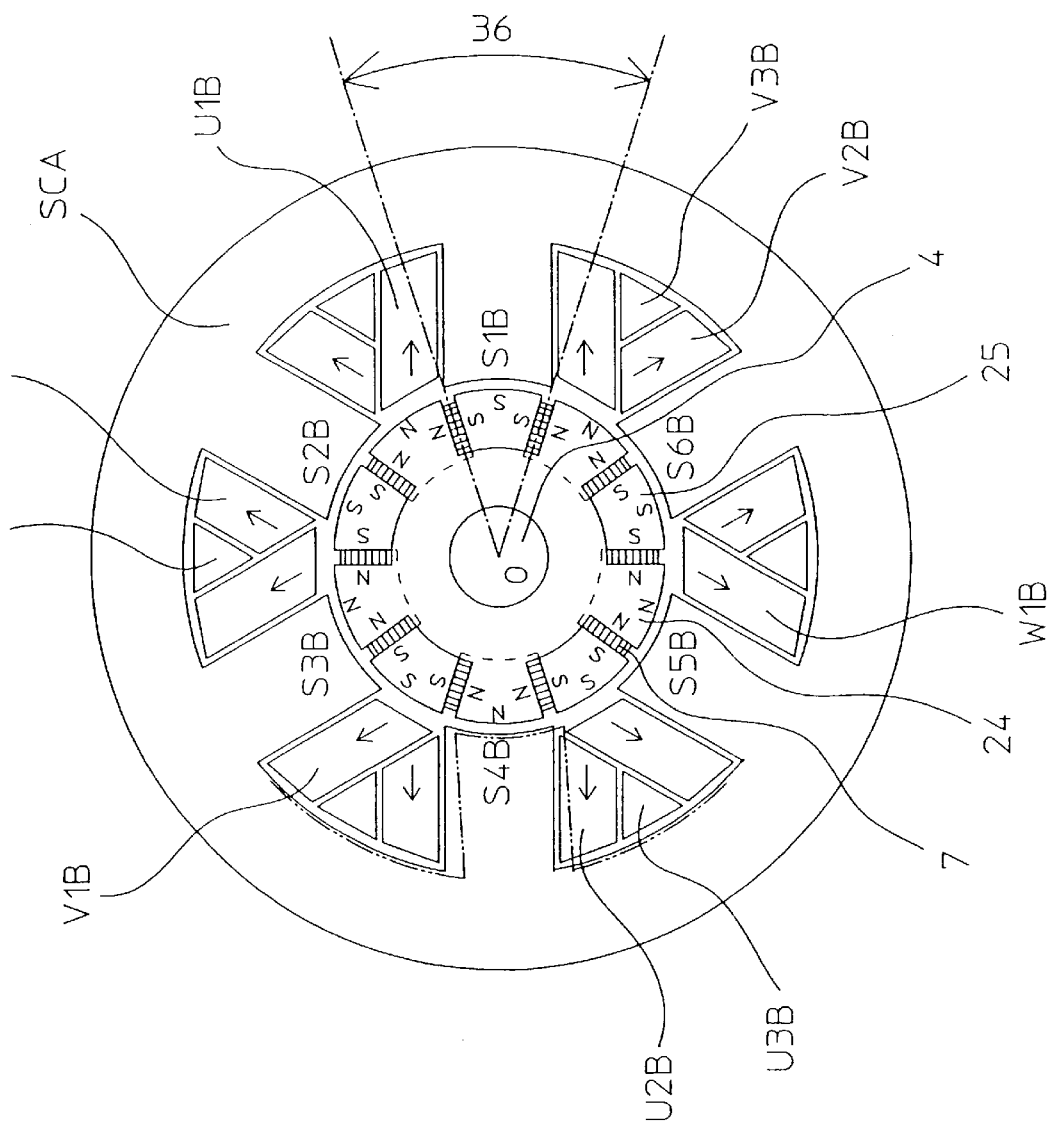
FIG. 12 is a sectional view of a permanent magnet motor according to the present invention.

FIG. 12 shows a sectional view in the radial direction of another embodiment of the invention. The rotor structure is similar to the structure of the permanent magnet motor shown on FIG. 1, except for the number of poles, which is increased from 8 poles to 10 poles. Reference numeral 24 and 25 represent an N pole magnetic pole and an S pole magnetic pole respectively, and the angle in the rotational direction of the rotor for one magnetic pole is 36 degrees. On the stator, 6 stator salient poles, S1B, S2B, S3B, S4B, S5B, and S6B are placed in the rotational direction of the rotor. The width of each of the salient poles in the rotational direction of the rotor is almost equal to the width of the magnetic pole of the rotor, and therefore, because the width of the stator tooth is 36 degrees, the angular width of the slot opening between each of the stator salient poles are broadened by 9 degrees, when compared to the 45 degrees width of the permanent magnet motor shown on FIG. 1. The flux density at the portion of each of the stator salient poles opposing the rotor, similar to the permanent magnet motor shown on FIG. 1, can be designed to be at a high flux density of 1.8 T, and the torque which can be generated by each of the stator windings is the same as before. However, the width of each of the slots of the stator is broadened by 9 degrees as mentioned above, and larger space is available to place the winding in the slot, allowing an increase in the number of windings when the wire radius of the stator winding is assumed to be the same. Thus, the permanent magnet motor shown on FIG. 12 can produce larger torque to the extent of the increase in the winding.

The threading method of the stator winding is explained hereinafter. One of the problems of the threading of the stator winding is that the slot opening is narrow. There are two methods to thread stator windings, one is to directly coil the winding on each slot, and the other is to form a coil outside the stator by coiling the winding and then inserting the coil into the slot. FIG. 12 shows the latter method of coiling, where a coil is formed by coiling the winding on an electrically insulating resinous bobbin etc. of specific shape, and then the coil is inserted in each of the slots. First, each of the coils W3B, U3B, and V3B is inserted to each of the stator salient poles S2B, S4B, and S6B, respectively. Then, each of the coils W2B, U2B, and V2B is inserted to each of the stator salient poles S2B, S4B, and S6B, respectively, and finally, each of the coils U1B, V1B, and W1B is inserted to each of the stator salient poles S1B, S3B, and S5B, respectively. By shaping the coil in this manner and inserting each of the coils in this order, the coils are easily threaded without physically interfering even when the opening of each slot is narrow. With the same principle, the shape of each of the coils and the threading order of the coils can be changed.

Generally, the winding density of the stator winding can be increased when the coil is formed by aligned-coiling the winding by winding machine outside the stator.

Next, a method to make the induced voltage shown on FIG. 11 sinusoidal is described as a reduction method of the torque ripples of the motor. A sine pattern, as is well known, can be achieved by removing the harmonic components included in the rectangular shaped waveform. The rectangular wave shown on FIG. 11 has a right-left symmetry and therefore no even order harmonic components are included. As shown on FIG. 10, because the 3-phase winding is delta-connected, the third order harmonic do not appear in the voltage between the motor terminals. This leads to a necessity of removing the fifth, the seventh, the eleventh, and the thirteenth, etc. order harmonics. For example, to remove the fifth order harmonic from the voltage at the U-phase of the permanent magnet motor shown on FIG. 1, because the windings U1A and U2A have the same voltage, the positions, in the rotational direction of the rotor, of the stator salient poles S1A and S4A have to be relatively shifted by an angle in which the fifth order harmonic is cancelled. Because the rotational period of the U-phase voltage is 90 mechanical degrees, the angle of one half of the period of the fifth order harmonic component is 9 degrees, and by relatively shifting the positions, in the rotational direction of the rotor, of the stator salient poles S1A and S2A by 9 degrees, the fifth order harmonic can be removed from the voltage of U-N shown on FIG. 10 or the voltage of U-N shown on FIG. 11(*a*). Because the phases of the voltages of the windings U1A and U2A are shifted by 36 electric degrees and COS (18°)=0.951, the amplitude of the fundamental wave component of the U-phase voltage in this process is reduced by 4.9%, a number in an acceptable range in practice. This technique can also be applied to remove the harmonic components from the V-phase voltage, W-phase voltage, or other voltages.

Another method for making the induced voltage into a sine pattern exists in which the rotor or the stator is divided into two in the axial direction of the rotor of the permanent magnet motor shown on FIG. 1, and then shifted in the rotational direction of the rotor by an angle half the period of the harmonic component, similar to the harmonics removal technique described above. By this method, specific harmonic component can be removed.

Other methods of causing the induced voltage to form a sine wave include a method to change the width in the rotational direction of the stator salient pole with respect to the width of the rotor magnetic pole, a method to shape the interior shape of the stator salient pole to a smooth round shape, and a method to skew the rotor or the stator. By employing a combination of the various harmonic removal techniques described above, harmonic components of the fifth, the seventh, the eleventh, the thirteenth order, and etc. can be removed, the voltage waveform of rectangular wave shown on FIG. 11 can be made into sine wave, and the torque ripples of the permanent magnetic motor shown on FIG. 1 can be reduced.

Although for the purpose of explanation, relatively specific examples of the invention are described above, all variations occurring within the scope of the principles of the present invention are to be included in the scope of the present invention. For example, while a 3-phase alternating current motor is described above, the present invention can also be applied to multiple phase alternating current other than 3-phase. Further, while a rotational motor is described, the present invention can be applied to a linear motor unfolded in a straight line.

According to the present invention, by more efficient use of the flux of the rotor, an increase in torque generated, an increase in efficiency, a decrease in size, and a decrease in cost of the permanent magnet motor can be achieved.

With the stator structure according to the present invention, the stator windings can be threaded easily and at a higher density, allowing decreases in size and in cost.

By the torque ripples reduction method according to the present invention, a permanent magnet with low torque ripple can be realized, enabling a motor control with low vibration, low noise, and high precision.

What is claimed is:

1. A permanent magnet motor having a plurality of phases, the motor comprising:

stator salient poles of each of the plurality of phases positioned in a stator, windings of each phase coiled on each of said stator salient poles, a plurality of individual permanent magnets having N poles and S poles alternately threaded to the inside of a rotor, a plurality of N pole magnetic poles, one N pole magnetic pole being magnetically connected to each of the N poles of said plurality of individual permanent magnets, and a plurality of S pole magnetic poles, one S pole magnetic pole being magnetically connected to each of the S poles of said plurality of individual permanent magnets, the plurality of N pole magnetic poles being positioned on the rotor surface and being commonly connected to an N pole magnetic circuit, and the plurality of S pole magnetic poles being positioned alternately with said N pole magnetic poles in the rotational direction of the rotor and being commonly connected to an S pole magnetic circuit.

2. A permanent magnet motor according to claim 1, further comprising:

N pole support magnetic poles connecting said N pole magnetic pole and other adjacent N pole magnetic poles, and S pole support magnetic poles connecting said S pole magnetic pole and other adjacent S pole magnetic poles, wherein said N pole magnetic circuit and said S pole magnetic circuit are alternately laminated in the axial direction of the rotor.

3. A permanent magnet motor according to claim 1, wherein said N pole magnetic circuit and said S pole magnetic circuit have structures in which flat rolled magnetic steel sheets and strips positioned perpendicular to the rotor axis are laminated in the axial direction, and the N pole magnetic circuit and an S pole support magnetic pole slightly connected partly to the N pole magnetic circuit are constructed on the same plane of each flat rolled magnetic steel sheets and strip, or the S pole magnetic circuit and an N pole support magnetic pole slightly connected partly to the S pole magnetic circuit are constructed on the same plane.

4. A permanent magnet motor according to claim 1, wherein the shape of the section of the coil which acts as the winding of each phase coiled on each of said stator salient poles is smaller than the slot entrance width between each of the salient poles, in order to allow fabrication of said coil outside the stator and then insertion into the stator salient pole to assemble, the shape CK1 of one type of said coil is nearly cylindrical and narrower than the slot entrance width, and the shape of the section of the shape CK2 of the other type of said coil is a shape having its area as the slot shape with the shape of section of said shape CK1 removed to avoid interference when said shape CK1 is inserted into the stator salient pole.

5. A permanent magnetic motor according to claim 1, wherein a plurality of stator salient poles exist for the same phase, and the phases of these stator salient poles relative to the rotor magnetic pole are shifted in the rotational direction of the rotor, by values of 60, 36, 25.7, or 16.36 electric degrees to remove harmonic components of the third, the fifth, the seventh, and the eleventh order, etc.

6. A permanent magnetic motor according to claim 1, wherein the axial direction of the stator or the rotor is divided, and respective electromagnetic characteristics are relatively shifted in the rotational direction of the rotor, by values of 60, 36, 25.7, or 16.36 electric degrees to remove harmonic components of the third, the fifth, the seventh, and the eleventh order, etc.

7. A permanent magnet motor having a plurality of phases, the motor comprising:

stator salient poles of each of the plurality of phases positioned in a stator, windings of each phase coiled on each of said stator salient poles, N pole flat rolled magnetic steel sheets and strip having a plurality of N pole magnetic poles salient from an N pole magnetic circuit of a near disc shape at a center to a periphery of the N pole flat rolled magnetic sheets and strip, S pole flat rolled magnetic steel sheets and strip having a plurality of S pole magnetic poles salient from a S pole magnetic circuit of a near disc shape at a center to a periphery of the S pole flat rolled magnetic sheets and strip, said S pole flat rolled magnetic steel sheets and strip laminated alternately with said N pole flat rolled magnetic steel sheets and strips in the axial direction of a rotor, and a common permanent magnet positioned between said N pole flat rolled magnetic steel sheets and strip and said S pole flat rolled magnetic steel sheets and strip, said common permanent magnet being threaded inside a rotor, one of the plurality of N pole magnetic poles being magnetically connected to each of N poles of said common permanent magnet, and one of the plurality of S pole magnetic poles being magnetically connected to each of S poles of said common permanent magnet.

8. A permanent magnet motor according to claim 7 further comprising:

N pole support magnetic poles connecting said N pole magnetic pole and other adjacent N pole magnetic poles, and S pole support magnetic poles connecting said S pole magnetic pole and other adjacent S pole magnetic poles.

9. A permanent magnet motor according to claim 3, wherein said N pole magnetic circuit and said S pole magnetic circuit have structures in which flat rolled magnetic steel sheets and strips positioned perpendicular to the rotor axis are laminated in the axial direction, and the N pole magnetic circuit and an S pole support magnetic pole slightly connected partly to the N pole magnetic circuit are constructed on the same plane of each flat rolled magnetic steel sheets and strip, or the S pole magnetic circuit and an N pole support magnetic pole slightly connected partly to the S pole magnetic circuit are constructed on the same plane.

10. A permanent magnet motor according to claim 3, wherein the shape of the section of the coil which acts as the winding of each phase coiled on each of said stator salient poles is smaller than the slot entrance width between each of the salient poles, in order to allow fabrication of said coil outside the stator and then insertion into the stator salient pole to assemble, the shape CK1 of one type of said coil is nearly cylindrical and narrower than the slot entrance width, and the shape of the section of the shape CK2 of the other type of said coil is a shape having its area as the slot shape with the shape of section of said shape CK1 removed to avoid interference when said shape CK1 is inserted into the stator salient pole.

11. A permanent magnetic motor according to claim 3, wherein a plurality of stator salient poles exist for the same phase, and the phases of these stator salient poles relative to the rotor magnetic pole are shifted in the rotational direction of the rotor, by values of 60, 36, 25.7, or 16.36 electric degrees to remove harmonic components of the third, the fifth, the seventh, and the eleventh order, etc.

12. A permanent magnetic motor according to claim 3, wherein the axial direction of the stator or the rotor is divided, and respective electromagnetic characteristics are relatively shifted in the rotational direction of the rotor, by values of 60, 36, 25.7, or 16.36 electric degrees to remove harmonic components of the third, the fifth, the seventh, and the eleventh order, etc.

* * * * *